(12) United States Patent
Cunningham et al.

(10) Patent No.: US 11,396,335 B2
(45) Date of Patent: Jul. 26, 2022

(54) SPOILER FLUTTER COUNTERMEASURE DEVICES AND CONTROL LOGIC FOR ACTIVE AERODYNAMIC SYSTEMS OF MOTOR VEHICLES

(71) Applicant: GM GLOBAL TECHNOLOGY OPERATIONS LLC, Detroit, MI (US)

(72) Inventors: Andrew Thomas Cunningham, Royal Oak, MI (US); James C. O'Kane, Shelby Township, MI (US); Robert G. Izak, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 683 days.

(21) Appl. No.: 16/424,073

(22) Filed: May 28, 2019

(65) Prior Publication Data

US 2020/0377158 A1    Dec. 3, 2020

(51) Int. Cl.

| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2019.01) |
| *B62D 35/00* | (2006.01) |

(52) U.S. Cl.
CPC ................... *B62D 35/007* (2013.01)

(58) Field of Classification Search
CPC ....... B62D 35/007; B62D 37/02; Y02T 10/82; Y02T 10/88

USPC ........................................................ 701/49
See application file for complete search history.

(56) References Cited

U.S. PATENT DOCUMENTS

| | | | |
|---|---|---|---|
| 4,867,397 | A | 9/1989 | Pamadi et al. |
| 5,280,990 | A | 1/1994 | Rinard |
| 5,360,252 | A | 11/1994 | Larsen |
| 5,908,217 | A | 6/1999 | Englar |
| 6,283,407 | B1 | 9/2001 | Hakenesch |
| 7,192,077 | B1 | 3/2007 | Hilleman |
| 7,255,387 | B2 | 8/2007 | Wood |
| 7,431,381 | B2 | 10/2008 | Wood |
| 8,196,994 | B2 | 6/2012 | Chen |

(Continued)

*Primary Examiner* — Mahmoud S Ismail
(74) *Attorney, Agent, or Firm* — Quinn IP Law

(57) ABSTRACT

Presented are flutter countermeasure devices and control logic for active aerodynamic systems, methods for making/using such active aero systems, and vehicles equipped with spoiler flutter countermeasure devices for increasing downforce and decreasing drag. A method of operating an active aerodynamic system of a motor vehicle includes detecting, via a system controller based on sensor data received from one or more sensing devices, a flutter excitation experienced by a spoiler of the active aero system during operation of the motor vehicle. The controller determines a harmonic oscillation amplitude of the flutter excitation experienced by the spoiler, and then determines if this harmonic oscillation amplitude exceeds a vehicle-calibrated threshold amplitude. If so, the system controller determines a damping force sufficient to mitigate or eliminate the harmonic oscillation amplitude. The controller then commands a flutter countermeasure device operatively attached to the spoiler to generate the damping force and thereby mitigate the flutter excitation.

20 Claims, 4 Drawing Sheets

(56) References Cited

U.S. PATENT DOCUMENTS

| | | | |
|---|---|---|---|
| 9,132,904 B2 | 9/2015 | Durham | |
| 9,333,994 B1 * | 5/2016 | Fahland | G05D 3/00 |
| 9,776,579 B1 | 10/2017 | Delaney et al. | |
| 10,167,915 B2 | 1/2019 | Titus et al. | |
| 10,189,516 B1 | 1/2019 | Sylvester et al. | |
| 2009/0026797 A1 | 1/2009 | Wood | |
| 2010/0181799 A1 | 7/2010 | Ryan et al. | |
| 2011/0068604 A1 | 3/2011 | Neuberger et al. | |
| 2011/0095564 A1 | 4/2011 | Chen | |
| 2011/0095566 A1 | 4/2011 | Chen | |
| 2011/0148140 A1 | 6/2011 | Benton | |
| 2011/0175395 A1 | 7/2011 | Guigne et al. | |
| 2013/0062908 A1 | 3/2013 | Henderson et al. | |
| 2017/0088106 A1 * | 3/2017 | Fahland | B60T 8/1766 |
| 2017/0088194 A1 * | 3/2017 | Heil | B62D 35/005 |
| 2017/0088200 A1 * | 3/2017 | Heil | B62D 37/02 |
| 2017/0088201 A1 * | 3/2017 | Heil | B62D 35/005 |
| 2017/0151984 A1 | 6/2017 | Bray et al. | |
| 2017/0158257 A1 | 6/2017 | Fahland et al. | |
| 2017/0158259 A1 | 6/2017 | Fahland et al. | |
| 2018/0297648 A1 | 10/2018 | Titus et al. | |
| 2018/0297649 A1 | 10/2018 | Thai et al. | |
| 2018/0297650 A1 | 10/2018 | Titus et al. | |
| 2018/0354565 A1 * | 12/2018 | Sylvester | B62D 35/007 |
| 2019/0092144 A1 | 3/2019 | Cunningham et al. | |
| 2019/0100077 A1 | 4/2019 | Weston et al. | |

* cited by examiner

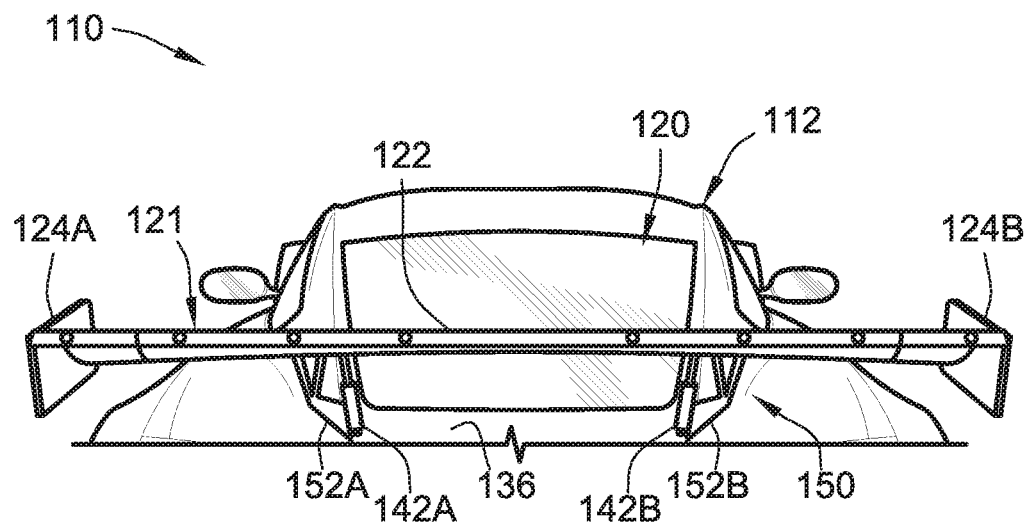
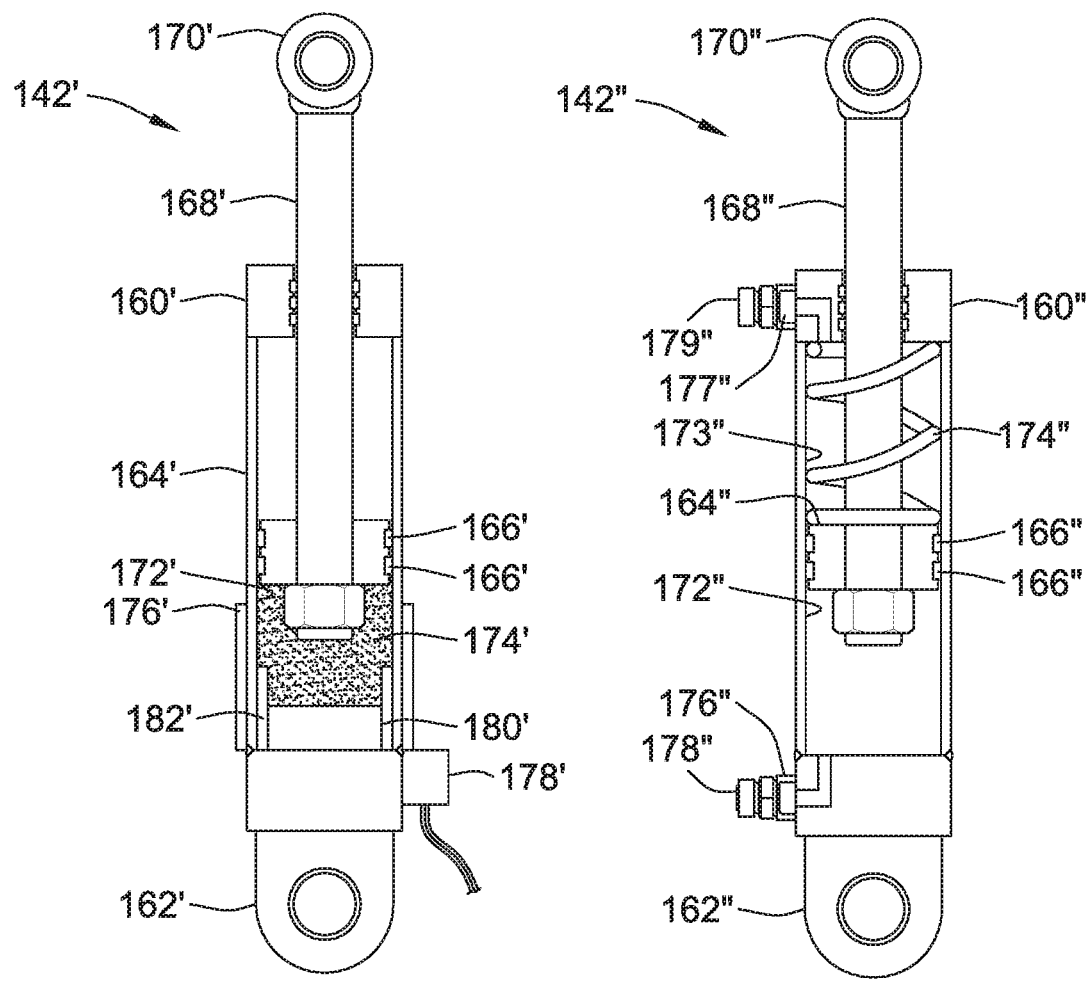
FIG. 2
FIG. 3
FIG. 4

SPOILER FLUTTER COUNTERMEASURE DEVICES AND CONTROL LOGIC FOR ACTIVE AERODYNAMIC SYSTEMS OF MOTOR VEHICLES

INTRODUCTION

The present disclosure relates generally to features for improving the aerodynamic performance of motor vehicles. More specifically, aspects of this disclosure relate to active aerodynamic systems and control logic for dynamically modifying a vehicle's aerodynamic characteristics.

Many current production motor vehicles, such as the modern-day automobile, are originally equipped or retrofit with stock body hardware or aftermarket accessories engineered to improve the aerodynamic performance of the vehicle. Front air dams and splitters, for example, modify the flow of air meeting and passing under the vehicle body to balance the distribution of fore and aft downforce. As the name implies, an air dam is a fluid barrier structure; in this case, one that is mounted underneath or integrated with the front bumper structure of the vehicle body, extending downward into proximity with the roadway. Air dams—or more colloquially "front spoilers"—enhance vehicle stability and aerodynamics by blocking and redirecting turbulent air flowing under the chassis. Splitters, on the other hand, are constructed as a planar extension to the very bottom of the front bumper, extending forward from the vehicle and parallel to the ground. A splitter acts like a wedge that forces high pressure air upwards and over the vehicle, and forces high speed, low pressure air underneath the car, resulting in a net positive downforce.

While splitters and air dams are designed to modify the aerodynamic characteristics of the front end of a vehicle, spoilers and diffusers operate to modify aerodynamic flow at the rear end of a vehicle. An air spoiler is normally anchored on top of the trunk lid or rear roof rail, and may be shaped similar in geometry to an inverted airfoil. Spoilers modify airflow and generate an aerodynamic pressure gradient that produces downforce on the rear tires. A rear diffuser, on the other hand, is a series of specially formed channels on the aft part of the vehicle underbody that improves aerodynamic properties by ameliorating the transition between high-velocity airflow along the undercarriage and the much slower freestream airflow of surrounding ambient air. Generally speaking, a rear diffuser helps underbody airflow to decelerate and expand by providing pressure recovery so that it does not cause excessive flow separation and drag.

For some high-performance automotive applications, the vehicle is equipped with an active aerodynamic element that can be reoriented or repositioned while the automobile is in motion to adjust the aerodynamic properties of the vehicle. One such "active aero" device is the deployable rear spoiler that can be dynamically retracted and extended based on vehicle operating conditions. At lower vehicle speeds, for instance, the spoiler is retracted to a stowed position, seated generally flush against the rear of the vehicle, to reduce fluid drag forces. When the vehicle reaches higher speeds—around 50 to 60 mph—the spoiler is automatically deployed to an extended position, displaced away or projecting angularly from the rear of the vehicle. In so doing, the deployed spoiler reduces the effects of turbulent air flow and generates additional downforce for improved vehicle stability and handling. Another available active aero device is the rotatable rear wing that has a dynamically adjustable pitch angle to control drag and downforce at various speeds and, for some architectures, provide air-braking capabilities.

SUMMARY

Disclosed herein are flutter countermeasure devices with attendant control logic for active aerodynamic systems, methods for making and methods for operating such active aero systems, and motor vehicles equipped with a flutter countermeasure device for increasing downforce and decreasing drag on the vehicle. By way of example, there are presented automotive wing flutter countermeasure devices with selective downforce generation and drag reduction capabilities. The wing flutter countermeasure device may employ a tuned-mass, tuned-liquid, ball-screw, and/or smart-fluid damper that is placed inside a hollow body/endplate of the airfoil and/or mounted to a stanchion/decklid buttressing the airfoil. Using closed-loop feedback and real-time sensor data, this damper is automated to dampen wind-borne flutter by varying the wing's natural frequency and/or offsetting the flutter-borne harmonic oscillation amplitude experienced by the wing. Disclosed wing flutter countermeasure devices may also be automated to adjust the wing's angle of attack (fore-aft pitch angle) to selectively modulate the vehicle's aerodynamics. As used herein, the terms "spoiler" and "wing" may be used to reference any logically relevant spoiler construction, including wing-type "pedestal" spoilers, lip spoilers, duck-tail and whale-tail spoilers, front, rear, roof and tailgate mounted spoilers, etc.

Attendant benefits for at least some of the disclosed concepts include wing flutter countermeasure devices and methods that provide improved aerodynamic vehicle performance through closed-loop feedback control of active aerodynamic devices with a governing vehicle controller. Disclosed active aero architectures also help to eliminate costs associated with implementing dedicated wing flutter sensors and attendant sensor calibration strategies, while retaining the performance and reliability advantages of directly measuring flutter. Active aero feedback systems presented herein also help to improve perceived vehicle quality by mitigating occupant-sensed vibrations. Wing flutter countermeasure techniques help to improve the accuracy of commanded downforces implemented by the active aero system, thereby further optimizing vehicle aerodynamic performance which helps to improve vehicle stability, reduce wind-borne noise, and minimize drag. Other attendant benefits include reduced part and manufacturing costs, decreased warranty issues, improved fuel economy, and vehicle mass reduction.

Aspects of this disclosure are directed to methods for making and methods for using any of the disclosed flutter countermeasure devices, active aero systems, and/or motor vehicles. In an example, a method is presented for operating an active aerodynamic system of a motor vehicle. This active aerodynamic system includes a resident system controller and an aerodynamic spoiler, both of which are mounted onto the body of the motor vehicle. This representative method includes, in any order and in any combination with any of the above and below disclosed options and features: detecting, via the system controller based on sensor data received from one or more in-vehicle or off-vehicle sensing devices, flutter excitation experienced by the spoiler during operation of the motor vehicle; determining, via the system controller, a harmonic oscillation amplitude and/or frequency of the flutter excitation experienced by the spoiler; determining, via the system controller, if the flutter's harmonic oscillation amplitude/frequency is greater than a calibrated threshold amplitude/frequency; responsive to the flutter's oscillation amplitude/frequency exceeding the preset calibrated threshold, determining a damping force sufficient to reduce or eliminate the harmonic oscillation amplitude/frequency, e.g., to below the calibrated threshold; and the system controller transmitting one or more command signals to a flutter countermeasure device operatively attached to the spoiler to generate the damping force sufficient to mitigate the flutter excitation.

Additional aspects of this disclosure are directed to motor vehicles with active aero systems having wing flutter countermeasure capabilities. As used herein, the terms "vehicle" and "motor vehicle" may include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels and other standard original equipment. Mounted on the vehicle body is a prime mover, such as an electric traction motor and/or an engine assembly, that operates to drive one or more of the road wheels and thereby propel the vehicle. An aerodynamic spoiler is mounted to any suitable location of the vehicle body; a flutter countermeasure device is operatively attached to the spoiler.

Continuing with the above example, the motor vehicle also includes a resident or remote system controller, which may be embodied as a network of distributed controllers for regulating operation of the flutter countermeasure device. The system controller is programmed to receive sensor data from one or more sensing devices and, based on this data, detect flutter excitation experienced by the spoiler during operation of the vehicle. Once detected, the controller determines a harmonic oscillation amplitude and/or frequency of the flutter excitation experienced by the spoiler, and then ascertains if this harmonic oscillation amplitude/frequency exceeds a vehicle-calibrated threshold amplitude/frequency. If so, the vehicle controller responds by determining a damping force that is sufficient to reduce or eliminate the harmonic oscillation amplitude, e.g., to below the calibrated threshold amplitude. Once determined, the system controller commands the flutter countermeasure device to generate the damping force and thereby mitigate the flutter excitation.

The above summary does not represent every embodiment and every aspect of the present disclosure. Rather, the foregoing summary merely provides examples of some of the novel concepts and features set forth herein. The above features and advantages, and other attendant features and advantages of this disclosure, will be readily apparent from the following detailed description of illustrated examples and representative modes for carrying out the disclosure when taken in connection with the accompanying drawings and the appended claims. Moreover, this disclosure expressly includes all combinations and subcombinations of the elements and features presented above and below.

BRIEF DESCRIPTION OF THE DRAWINGS

FIG. 2 is a partially schematic, rear-view illustration of another representative motor vehicle equipped with an automated rear pedestal spoiler assembly with a wing flutter countermeasure device in accord with aspects of the disclosed concepts.

FIG. 3 is a schematic illustration of a representative magnetorheological (MR) fluid damper flutter countermeasure device in accordance with aspects of the present disclosure.

FIG. 4 is a schematic illustration of a representative unequal area (UEA) linear damper flutter countermeasure device in accord with aspects of the disclosed concepts.

Figure 1:
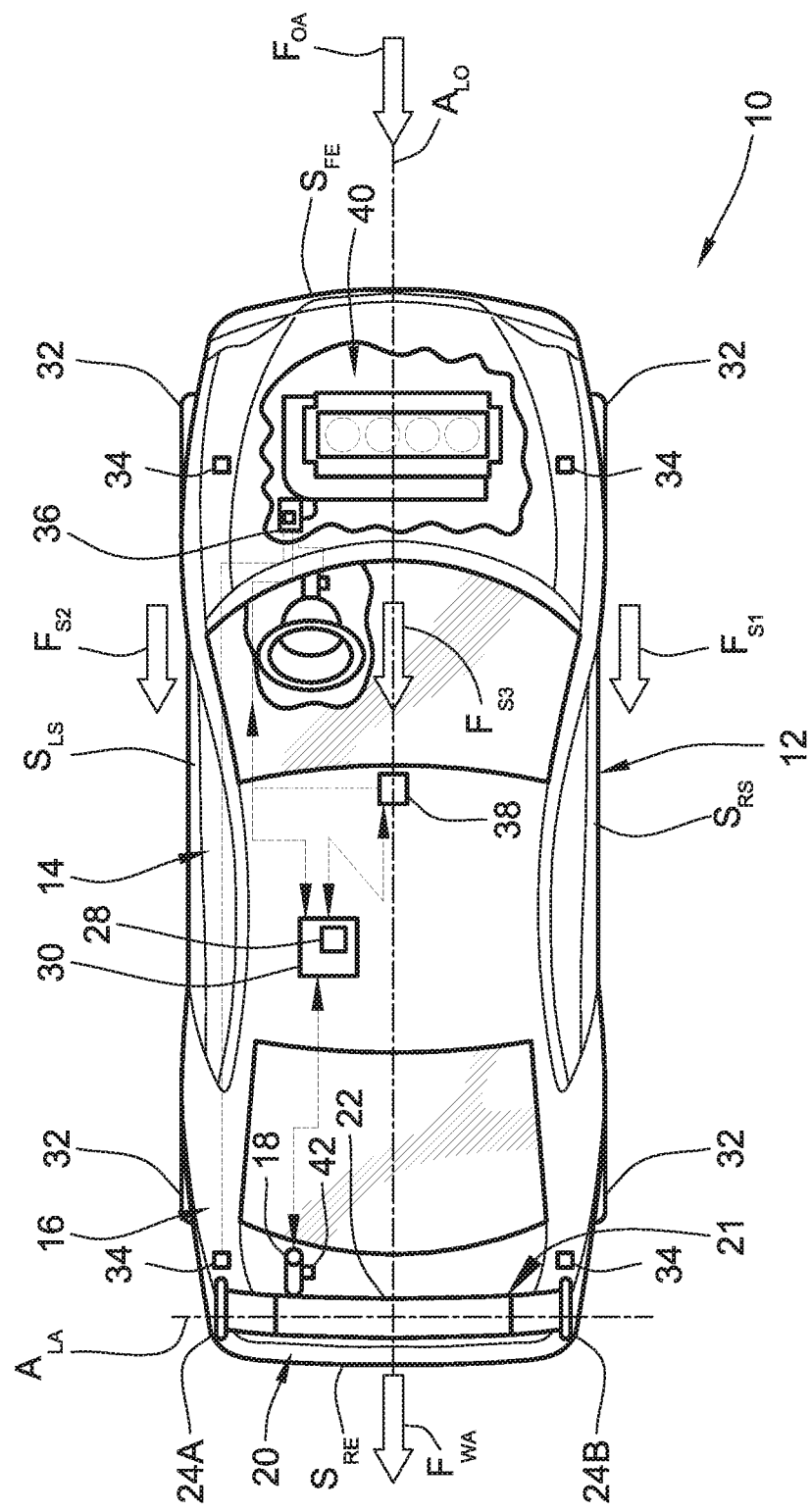
FIG. 1 is a partially schematic, plan-view illustration of a representative motor vehicle equipped with an active aerodynamic system with flutter countermeasure and downforce generation features in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these illustrative embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on an ordinary driving surface.

Referring now to the drawings, wherein like reference numbers refer to like features throughout the several views, there is shown in FIG. 1 a partially schematic illustration of a representative automobile, which is designated generally at 10 and portrayed herein for purposes of discussion as a two-seat, coupe-style passenger vehicle. Mounted to the body 12 of the automobile 10, e.g., aft of a passenger compartment 14 and above a rear cargo compartment 16 (also referred to herein as "trunk"), is an actively controlled ("active") aerodynamic system 20 for improving aerodynamic performance of the vehicle 10. The illustrated automobile 10—also referred to herein as "motor vehicle" or "vehicle" for short—is merely an exemplary application with which novel aspects and features of this disclosure may be practiced. In the same vein, implementation of the present concepts into a rear-mounted, pedestal-type rotatable wing spoiler should also be appreciated as a representative application of the novel features disclosed herein. As such, it will be understood that aspects and features of this disclosure may be applied to other spoiler configurations, may be incorporated into alternative active aero system layouts, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

As shown in FIG. 1, the vehicle body 12 defines four body sides: a body front side or front end $S_{FE}$, a body rear side or rear end $S_{RE}$ opposite the front end $S_{FE}$, a lateral port side or left side $S_{LS}$, and a lateral starboard side or right side $S_{RS}$ opposite the left side $S_{LS}$. The left (port) side $S_{LS}$ and right (starboard) side $S_{RS}$ are generally parallel to one another and with respect to a longitudinal axis $A_{LO}$ of the vehicle 10, and span the distance between the vehicle's front and rear ends $S_{FE}$, $S_{RE}$. During normal vehicle operation, the front end $S_{FE}$ is oriented to face oncoming ambient airflow $F_{OA}$ when the vehicle 10 is in forward motion relative to the road surface. As the vehicle 10 moves across the road surface, ambient airflow $F_{OA}$ strikes and passes around the vehicle body 12, splitting into various airflow portions. These airflow portions are represented in FIG. 1 by a first airflow portion $F_{S1}$ passing around the starboard side $S_{RS}$ of the vehicle 10, a second airflow portion $F_{S2}$ passing around the vehicle's port side $S_{LS}$, and a third airflow portion $F_{S3}$ passing over the top of the vehicle 10. A fourth airflow portion (not visible in the view provided) passes underneath the vehicle 10 along the undercarriage thereof. These airflow segments $F_{S1}$, $F_{S2}$ and $F_{S3}$ eventually rejoin in a wake area or recirculating airflow region $F_{WA}$ immediately behind the vehicle's rear end $S_{RE}$.

Automobile 10 is retrofit or stock equipped with one or more active aero devices, an example of which is shown in FIG. 1 as a rotatable spoiler assembly 21 with a selectively modifiable angle of attack. In particular, the fore-aft "nose up, nose down" pitch of the active spoiler assembly 21 relative to the driving surface may be dynamically altered during forward vehicle travel. Rotation of the spoiler assembly 21 about a transverse vehicle axis $A_{LA}$ is automated via a vehicle controller 30, which may be resident to or remote from the body 12 of the vehicle 10. This active spoiler assembly 21 includes a wing-shaped main body 22 terminating at opposing ends thereof with spoiler endplates or "fins" 24A and 24B. As used herein, the term "wing-shaped" may be defined as a structure having an airfoil shape that produces an aerodynamic force, such as lift or downforce, during propulsion through a fluid. The spoiler's main body 22 and endplates 24A, 24B cooperatively regulate the movement of ambient airflow along the longitudinal axis $A_{LO}$ of the vehicle body 12 aft of the passenger compartment 14. In FIG. 1, the spoiler assembly 21 is has a pedestal-type spoiler architecture employing a stanchion assembly (FIG. 2) for mounting the spoiler's main body 22 to the vehicle's body 12. The wing-shaped body 22 and endplates 24A, 24B may be formed from a suitably rigid but low mass material, such as an engineered plastic, fiber-reinforced glass composite, or aluminum, e.g., for structural stability and resiliency. While shown equipped with a single active aero device 20, which is configured as a rear pedestal spoiler with modifiable pitch angle, it is envisioned that the vehicle 10 may be equipped with additional or alternative active aero devices, which may be similar to or distinct from the representative example shown in the drawings.

Fore-aft pitch angle of the rotatable spoiler assembly 21 may be adjusted relative to the vehicle body 12 via an electronically controlled flutter countermeasure device 18. For fluid-driven actuator devices, fluid pressure within this device 18 is modulated via the vehicle controller 30, e.g., through command signal control of a fluid pump, bleed valve, etc., to vary the orientation of the active aero device 20. Rotating the spoiler assembly 21 about the transverse vehicle axis $A_{LA}$ acts to modify movement of ambient airflow $F_{OA}$ relative to the vehicle body 12 and thereby vary downforces generated by the airflow on the vehicle 10. In automotive applications, a "downforce" may be typified as a vertical component of an aerodynamic force acting on a moving vehicle to press it downward toward the road surface, e.g., counteracting lift on the vehicle body at elevated road speeds. Hydraulic and pneumatic actuators convert pressurized liquids (pumped oil) or gases (compressed air), respectively, into linear, rotatory or oscillatory motion. As will be described in further detail below, the flutter countermeasure device 18 may include a fluid-tight cylinder mounted to the vehicle body 12, and a piston mechanically coupled at one end to the spoiler's main body 22 and dividing the cylinder into two chambers. A control valve connects the cylinder to a hydraulic or pneumatic circuit, which may require a sump volume for hydraulic applications. A two-way pump is driven in rotation by an electric motor, with a switching device that allows connection ports of one or both chambers to be connected either to the control valve or the pump. In this manner, fluid pressure within one or both chambers of the cylinder is selectively increased and decreased to effectuate linear motion of the piston, which in turn causes movement of the spoiler assembly.

While shown as an adjustable-angle rear spoiler assembly, the active aero device 20 may take on various forms, including that of an adjustable-position spoiler, an adjustable-position splitter, an adjustable-position air dam, an adjustable-position diffuser, an adjustable ride-height suspension, deployable flaps, and/or a variable-position hood shutter having moveable louvers that can be shifted between opened and closed positions. As such, the active aero device 20 can be positioned on the front end S or the rear end $S_{RE}$ of the vehicle 10, or at any logically applicable location therebetween. Moreover, the flutter countermeasure device 18 may be embodied as a fluid-driven linear actuator, a fluid-driven rotary actuator, a single-acting or dual-acting actuator, a ram or diaphragm actuator, a single actuator, or a series of collaborative actuators, or any combination thereof.

As indicated above, electronic vehicle controller 30 is constructed and programmed to govern, among other things, the movement of the active aero system 20 to selectively modify the aerodynamic characteristics of the motor vehicle 10. Control module, module, controller, control unit, electronic control unit, processor, and any permutations thereof may be defined to include any one or various combinations of one or more of logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software or firmware programs or routines.

Software, firmware, programs, instructions, routines, code, algorithms, and similar terms may be used interchangeably and synonymously to mean any processor-executable instruction sets, including calibrations and look-up tables. The controller 30 may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

With continuing reference to FIG. 1, the vehicle 10 employs one or more prime movers, such as an internal combustion engine (ICE) assembly 40, to transmit tractive power, e.g., through a multi-speed power transmission and drivetrain, to multiple road wheels 32. An array of wheel sensors 34 arranged at various locations throughout the vehicle body 12 operate to detect respective rotating speeds for each of the road wheels 32, and communicate signals indicative thereof to the vehicle controller 30. Once received, the vehicle controller 30 may be programmed to process, analyze and store sensor data, e.g., in resident memory device 28, including correlating wheel speed data of sensor(s) 34 to road speed of the vehicle 10.

Automobile 10 is also equipped with one or more vehicle dynamics sensors 36, each of which may be in the nature of a single-axis or a triple-axis accelerometer, an angular rate sensor, an inclinometer, etc., for detecting yaw, pitch, roll, forward acceleration/deceleration, lateral acceleration/deceleration or any other dynamics related information of the vehicle 10 relative to the road surface, and communicate signals indicative thereof to the controller 30. In FIG. 1, the dashed arrows interconnecting the various illustrated components are emblematic of electronic signals or other communication exchanges by which data and/or control commands are transmitted, wired or wirelessly, from one component to the other. In addition, while shown as a constituent part of the vehicle controller 30 (e.g., embodied as main or auxiliary memory), memory device 28 of FIG. 1 may be a discrete integrated circuit (IC) device that is separately mounted to vehicle body 12, or may be remote from the vehicle 10 and accessible, e.g., via wireless communication over a distributed computer network.

It is envisioned that the vehicle 10 may utilize additional or alternative sensors, packaged at similar or alternative locations, to help execute any of the disclosed operations. For instance, the representative vehicle 10 of FIG. 1 is also equipped with one or more airflow sensors 38 designed to detect the velocity of the ambient airflow $F_{OA}$ relative to the vehicle 10, and communicate the detected airflow velocity to the vehicle controller 30. Airflow sensor(s) 38 may take on various designs, such as a pitot tube configured to detect the pressure of the ambient airflow $F_{OA}$ at a specific location relative to the vehicle body 12; the controller 30 may execute instructions to correlate the measured pressure to airflow velocity. In addition to the previously described sensing devices, the vehicle 10 is further equipped with one or more pressure sensors 42 mounted to the vehicle body 12 and directly or indirectly coupled to the fluid-driven actuator 18. This pressure sensor 42 is operable to detect operating fluid pressures within the fluid-driven actuator 18 and generate fluid pressure signals indicative thereof. The pressure sensor 42 may be embodied as any available pressure sensing device, including pressure transducers, capacitive pressure sensors, strain-gauge pressure sensors, piezometers, manometers, bourdon and aneroid sensors, and the like. Optionally, one or more of the aforementioned sensors may be in the form of rotational position sensors, linear position sensors, ultrasonic sensors, laser sensors, and smart-material-based sensors, etc.

FIG. 2 provides another representative example of a motor vehicle 110 with an active aerodynamic system 120 that, like the active aero system 20 of FIG. 1, is embodied as a dynamically repositionable wing-type pedestal spoiler assembly 121. While differing in appearance, it is envisioned that any of the features disclosed with reference to the examples of FIGS. 2-7 may be incorporated, singly or in any combination, into the example of FIG. 1, and vice versa. In FIG. 2, the active aerodynamic system 120 employs a stanchion assembly 150 for mounting the spoiler's main body 122 (also referred to herein as "airfoil body") to the vehicle 110. Stanchion assembly 150 is generally composed of two laterally spaced, upright mounting brackets 152A and 152B. Each mounting bracket 152A, 152B is rotatably attached along an upper end thereof, e.g., via trunnion pivot brackets, bolts and preaffixed on assembly (POA) nuts (not visible) to the main body 122, and rigidly mounted along a lower end thereof, e.g., via gaskets, bolts, and clips (not visible), to the rear decklid 136 of the vehicle body 112. A pair of spoiler endplates 124A and 124B are attached to opposing longitudinal ends of the main body 122. These endplates 124A, 124B are designed to control spanwise vortices and limit associated vortex-induced drag.

Active aero system 120 of FIG. 2 is automated by an electronic control unit, such as vehicle controller 30 of FIG. 1, to vary the pitch angle of the spoiler assembly 121 relative to the decklid 136 of the vehicle body 112. In so doing, the active aero system 120 is operable to selectively increase downforce and decrease drag on the rear of the vehicle 110, e.g., at elevated vehicle speeds. If desired, the system 120 may selectively apply a left-side downforce bias and a right-side downforce bias, e.g., for a turning maneuver, or selectively increase downforce and drag on the rear of the vehicle 110, e.g., for an air-braking maneuver. For instance, the active aero system 120 is equipped with a set of linear actuators 142A and 142B that are mounted to the vehicle body 112, interposed between the mounting bracket 152A, 152B and underneath the spoiler's main body 122. Selective activation of these linear actuators 142A and 142B concomitantly modifies fore and aft "pitch" rotation of the main body 122 and endplates 124A and 124B. According to the illustrated example, the linear actuators 142A, 142B may be structurally identical; thus, for purposes of brevity, the characteristics of both linear actuators 142A, 142B may be described by way of reference to a single actuator 142' of FIG. 3 or actuator 142" of FIG. 4.

As will be explained in further detail below, the linear actuators 142A and 142B may also double as or, alternatively, may function solely as wing flutter countermeasure devices for mitigating flutter-borne harmonic oscillation induced on the main body 122 during operation of the motor vehicle 10. The term "flutter" may be typified as a dynamic instability of an airfoil resulting from a combination of structure-imputed and motion-induced instantaneous aerodynamic forces. Once a stability limit is manifested at a so-called critical "flutter speed," the time-varying phase displacement generally present between the vibrational motions of the vehicle and the resulting aerodynamic forces on the airfoil assumes a value that leads to aerodynamic damping-out and, hence, to input of energy from the air flow causing the airfoil structure to oscillate.

FIG. 3 illustrates the linear actuator 142' as a combination magnetorheological (MR) damper and linear actuator. As shown, the MR fluid damper/actuator 142' is fabricated with a cylindrical outer housing (or "cylinder") 160' that is mounted, e.g., via pivot end connector 162' and a mating pivot block (not shown), to the rear decklid 136 of the vehicle 110 (or the main airfoil body 120 of the spoiler assembly 121). A puck-shaped piston 164' with fluid-sealing O-rings 166' is reciprocally movable within the cylinder 160'. The piston 164' is mounted, e.g., via piston rod 168' and rod end connector 170', to the main airfoil body 122 (or the rear decklid 136). A lower (apply) face of the piston 164' and an inner periphery of the cylinder 160' cooperatively define therebetween a fluid cavity 172' within which is stored an MR fluid 174'. A coil-wound electromagnet 176' is mounted to a lower end of the cylindrical outer housing 160', circumscribing the fluid cavity 172'. A printed circuit board (PCB) controller 178' governs the feed of electric current to the coil-wound electromagnet 176'. A hydraulic accumulator 180' and an elastic diaphragm 182' are packaged within cylinder 160', nested at a bottom end of the fluid cavity 172' in opposing faced relation to the piston 164'.

To function as an actuator, the MR fluid damper/actuator 142' releases potential energy in a compressed gas (e.g., nitrogen) stored inside the hydraulic accumulator 180'. This energy causes the gas to expand and push against the elastic diaphragm 182'. The diaphragm 182', in turn, increases pressure on the MR fluid 174', which transfers the pressure to the lower (apply) face of the piston 164'. The pressure drives the piston 164' and piston rod 168', e.g., upward in FIG. 3; the piston rod 168', in turn, pushes against a forward or rearward end of the main body 122 to tilt the same. To function as a damper, the coil-wound electromagnet 176' of MR fluid damper/actuator 142' is selectively actuable via PCB controller 178' to produce a magnetic field. This magnetic field causes randomly dispersed nanoparticles suspended within the MR fluid 174' to align and thereby increase the viscosity of the fluid 174'. The magnetic field and, thus, the viscosity of the MR fluid 174' may be selectively modulated to generate a counteracting damping force sufficient to mitigate wing flutter excitation on the spoiler's main body 122.

Turning next to FIG. 4, there is shown an alternative flutter countermeasure device in the form of an unequal area (UEA) linear damper and actuator 142". Similar to the embodiment of FIG. 3, the UEA damper/actuator 142" of FIG. 4 is fabricated with a cylindrical outer housing (or "cylinder") 160" that is mounted, e.g., via pivot end connector 162" and a mating pivot block or ball joint (not shown), to the rear decklid 136 of the vehicle 110 (or the main airfoil body 120 of the spoiler assembly 121). A puck-shaped piston 164" with fluid-sealing O-rings 166" is reciprocally movable within the interior of the cylinder 160". The piston 164" is mounted to the main airfoil body 122 (or the rear decklid 136), e.g., via piston rod 168", rod end connector 170", and mating pivot block or ball joint (not shown). Opposing upper and lower faces of the piston 164" and an inner periphery of the cylinder 160" cooperatively define first and second fluid cavities 172" and 173", respectively. An optional helical compression spring 176" is located inside the second fluid cavity 173", interposed between the upper face if the piston 164" and an interior surface of the upper end of the cylinder 160".

UEA damper/actuator 142" of FIG. 4 allows for high-speed positional control and, through such positional control, flutter damping of the spoiler's main body 122 and endplates 124A, 124B. First and second fluid ports 176" and 177" respectively fluidly couple the first and second fluid cavities 172", 173" to a source of pressurized liquid or gas (not shown). Each port 176", 177" is provided with a dedicated electronic valve 178" and 179" that is independently selectively actuable, e.g., via vehicle controller 30, to regulate the entry and exit of fluid to/from the cavities 172", 173". Controlled application of hydraulic fluid acting on opposing faces of the piston 164" causes the piston 164" to translate rectilinearly (e.g., up and down in FIG. 4). Piston movement, in turn, modulates movement of the spoiler's main body 122 to thereby generate a damping force sufficient to mitigate flutter excitation.

While shown mounted adjacent the stanchions 152A, 152B and obliquely angled with respect to the main body 122, the actuators 142A, 142B may be packaged at other locations and/or with other orientations with respect to the vehicle body 112 (e.g., underneath the decklid 136 or inside complementary cavities within the stanchions 152A, 152B). It is also envisioned that the active aerodynamic system 120 may employ greater or fewer than two actuators 142A, 142B and may employ actuators of differing configurations from those which are shown in the drawings. An optional configuration may employ ball joints to mount the opposing ends of the actuators 142A, 142B to the main body 122 and decklid 136; with this configuration, each actuator 142A, 142B may be independently controlled to adjust the lateral "roll" angle of the wing and thereby vary side-to-side downforce on the vehicle 110, e.g., for improved cornering. For applications in which the linear actuators 142A, 142B are employed solely for wing-flutter damping, the actuators 142A, 142B may be installed inside complementary cavities within the main body 122 or end plates 124A, 124B. Variable viscosity of the MR fluid 174' offers selective damping of vibrations at various input frequencies and amplitudes.

Figure 5:
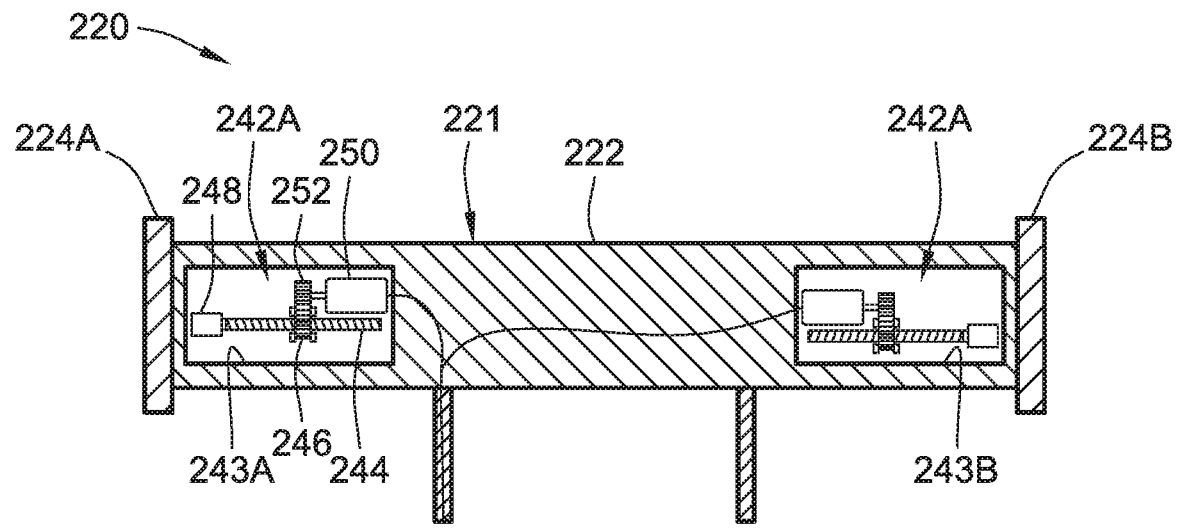
FIG. 5 is a schematic illustration of a representative wing-type pedestal spoiler with a ball-screw damper wing flutter countermeasure device in accord with aspects of the disclosed concepts.

FIG. 5 illustrates yet another representative active aerodynamic system 220 that generally comprises a wing-type pedestal spoiler assembly 221 with multiple internally mounted wing flutter countermeasure devices. In accord with the illustrated example, a pair of ball-screw linear dampers 242A and 242B is mounted within discrete compartments 243A and 243B that are located inside the main airfoil body 222. Each compartment 243A, 243B is positioned at a respective lateral end of the main airfoil body 222, adjacent one of the spoiler endplates 224A and 224B. It may be desirable, e.g., for ease of design and manufacture, that the linear dampers 242A, 242B be structurally identical to each other; thus, for purposes of brevity, the structural and functional characteristics of both linear dampers 242A, 242B are described by way of reference to the left-most (first) ball-screw linear damper 242A of FIG. 5. Alternative configurations may employ multiple distinct damper types or may employ a single damper located at the center of the airfoil body.

First ball-screw linear damper 242A of FIG. 5 is fabricated with a threaded screw shaft 244 that extends through a ball nut 246. The threaded screw shaft 244 provides a helical raceway for a succession of ball bearings (not visible) recirculated through the ball nut 246. Mounted at one end of the threaded screw shaft 244 is a damper mass 248 of sufficient size to provide tuned mass damping that stabilizes harmonic vibration. A spur gear 252 drivingly engages an output shaft of an electric motor 250 with circumferentially spaced gear teeth on the exterior of the ball nut 246. This motor 250 is operable, e.g., via vehicle controller 30, to rotate the ball nut 246 and, thus, translate the threaded screw shaft 244, e.g., to the left and right in FIG. 5, to thereby generate a damping force sufficient to mitigate flutter excitation on the spoiler assembly 221.

Figure 6:
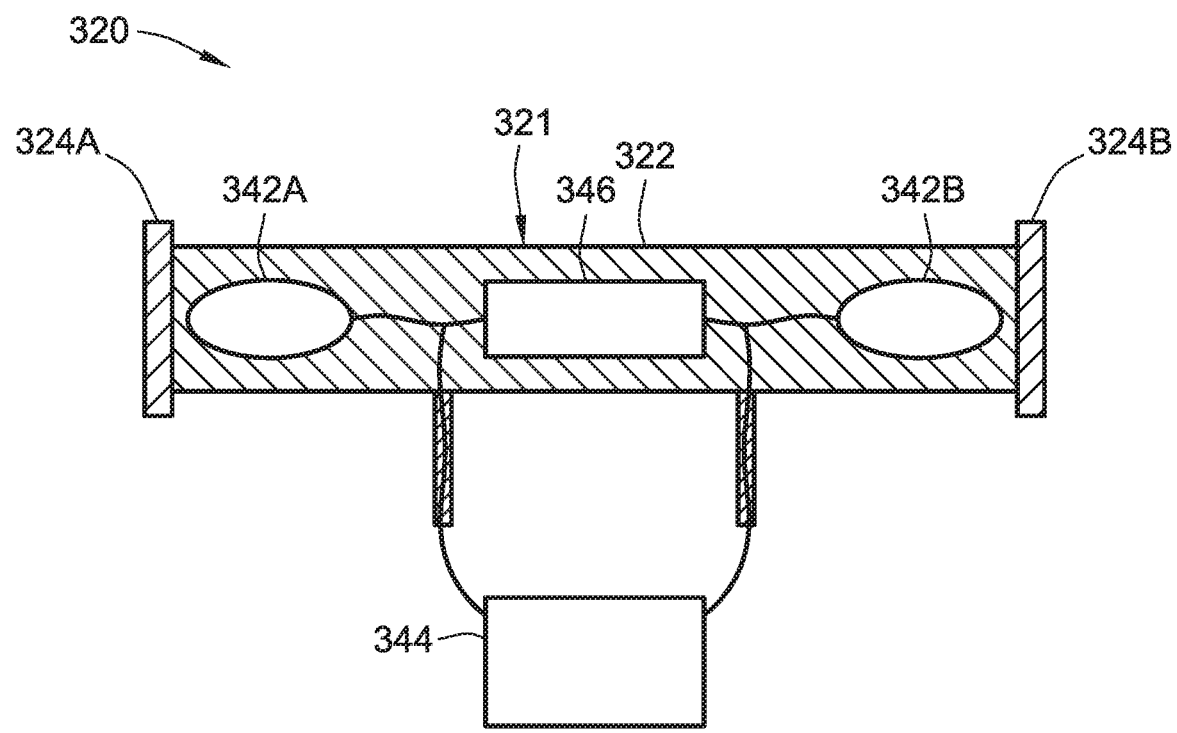
FIG. 6 is a schematic illustration of a representative wing-type pedestal spoiler with a variable-volume bladder wing flutter countermeasure device in accord with aspects of the disclosed concepts.

As yet another non-liming example, FIG. 6 illustrates a representative active aerodynamic system 320 with a wing-type pedestal spoiler assembly 321 and an internally mounted hydrodynamic wing flutter countermeasure system. In accord with the illustrated example, a pair of variable-volume bladder dampers 342A and 342B is integrated into the main airfoil body 322. Each bladder damper 342A, 342B is shown located at a respective lateral end of the main airfoil body 322, adjacent one of the spoiler endplates 324A and 324B. Both bladder dampers 342A, 342B are fluidly connected to a fluid reservoir 344 that may be mounted inside the vehicle's trunk (e.g., rear cargo compartment 16) or, optionally, inside a dedicated cavity inside the spoiler assembly 321. An electric pump 346 is operable to selectively fill and empty the bladder dampers 342A, 342B with fluid to modulate a working mass of the spoiler assembly 321. In so doing, the active aero system 320 is able to counteract wing flutter excitation experienced by the spoiler assembly 321.

Figure 7:
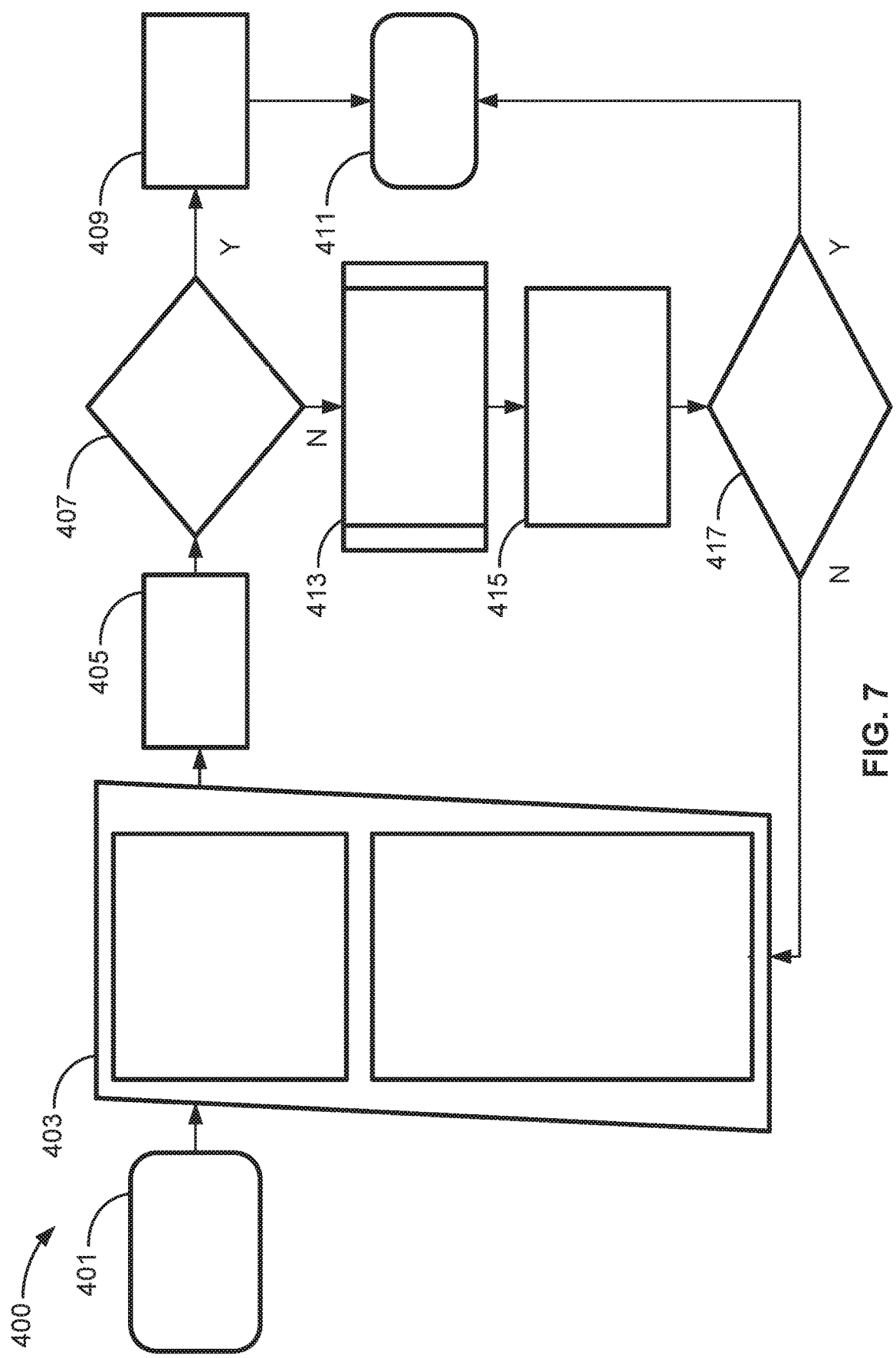
FIG. 7 is a flowchart illustrating a representative control algorithm for operating an active aero system with wing flutter countermeasure device, which may correspond to memory-stored instructions executed by an onboard or remote controller, control-logic circuitry, programmable electronic control unit, or other integrated circuit (IC) device or a network of IC devices in accord with aspects of the disclosed concepts.

With reference now to the flow chart of FIG. 7, an improved method or control strategy for dynamically governing operation of an active aerodynamic system, such as active aero systems 20, 120, 220 and 320 of FIGS. 1-6, for a motor vehicle, such as automobile 10 of FIG. 1, is generally described at 400 in accordance with aspects of the present disclosure. Some or all of the operations illustrated in FIG. 7 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 400 begins at terminal block 401 of FIG. 7 with processor-executable instructions for a programmable controller or control module or similarly suitable processor to call up an initialization procedure for a wing flutter countermeasure protocol. This routine may be executed in real-time, continuously, systematically, sporadically, and/or at regular intervals during active or autonomous vehicle operation. As yet another option, block 401 may initialize responsive to a user input prompt from an occupant of the vehicle, such as one or more electrical signals indicating a selection to START ACTIVE AERO has been submitted by the vehicle's driver through a graphical user interface (GUI) of a center console telematics unit or other similarly suitable interface. To carry out this protocol, a vehicle control system or any combination of one or more subsystems may be operable to receive, process, and synthesize pertinent information and inputs, and execute control logic and algorithms to regulate vehicle systems and subsystems to achieve desired control targets. As yet a further option, it is recognized that the vehicle will operate at various speeds and under countless combinations of external factors (e.g., road conditions, weather conditions, traffic conditions, etc.); as such, the methodology set forth in FIG. 7 may be implemented in response to specific vehicle-calibrated operating conditions that have been predetermined to cause flutter.

Upon initialization of the wing flutter countermeasure protocol at block 401, method 400 proceeds to input/output block 403 with memory-stored, processor-executable instructions to receive, collect, read or retrieve (hereinafter "receive") sensor data from one or more sensing devices. From this data, a system controller may measure, calculate, estimate, or conclude (hereinafter "determine") if a spoiler assembly is being subjected to flutter excitation during operation of the motor vehicle. As indicated above, one or more of the active aero system's flutter countermeasure devices may include a fluid cavity within which is stored a fluid (e.g., fluid cavity 172' of FIG. 3, fluid cavities fluid cavity 172" and 173" of FIG. 4, fluid reservoir 344 of FIG. 6, etc.). A pressure sensor, such as a silicon piezoresistive pressure sensor integrated into PCB controller 178' of FIG. 3, monitors fluid contained in the cavity and detects a pressure differential therein. Measurable oscillations in this pressure differential may indicate the presence of flutter. For at least some applications, the flutter sensing device from which sensor data is received may include an accelerometer, such as the single-axis or triple-axis accelerometers described above, that detects oscillating displacement of a spoiler's main body. As indicated above, a vehicle dynamics sensor, such as dynamics sensors 36 of FIG. 1, may be operable to detect a dynamic operating condition of the motor vehicle, such as a component position of a suspension component of the motor vehicle (e.g., the angle of a control arm, strut bar, or stabilizer bar), a current (real-time) acceleration of the motor vehicle (e.g., straightaway and/or turning), a current (real-time) speed of the motor vehicle (e.g., straightaway and/or turning), and/or an air speed of ambient air flowing over, under and/or around the motor vehicle body. As yet a further option, the active aero control system may employ data generated by one or more vehicle cameras, a Light Detection and Ranging (LIDAR) system, and/or a radar system to detect flutter. Any of the aforementioned sensor data may be aggregated, filtered, classified, fused and analyzed, and may be packaged with other vehicle functions, like wind direction monitoring (e.g., effects of downforce and yaw moment), and autonomous vehicle control.

Detection of flutter excitation at input/output block 403 trigger the method 400 to advance to process block 405 to determine a harmonic oscillation amplitude and frequency of the flutter excitation experienced by the spoiler. As an example, the hydraulic fluid pressure within the aforementioned fluid cavity may be observed to measure wing vibration amplitude and frequency. Optionally, placement of an accelerometer in direct contact with the airfoil would allow for measurements of flutter amplitude and frequency to be taken directly from the spoiler assembly. Other options may include taking real-time measurements of airfoil displacement and velocity from which frequency and amplitude can be calculated.

Progressing to decision block 407, the system controller determines if the harmonic oscillation amplitude and/or frequency of the flutter excitation on the spoiler is within a pre-defined acceptable range (e.g., it does not exceed a vehicle-calibrated threshold amplitude/frequency). Upon determining that the amplitude and/or frequency does not exceed the preset calibrated threshold and, thus, is within a pre-defined acceptable range (block 407=YES), the method 400 proceeds to process block 409 and concomitantly disengages the flutter countermeasure device(s) such that limited or no damping action is taken. At this juncture, the method 400 of FIG. 7 may advance from process block 409 to terminal block 411 and terminate, or may loop back to terminal block 401 and run in a continuous loop.

Consequent to a decision that the harmonic oscillation amplitude/frequency exceeds the preset calibrated threshold and, thus, is not within acceptable range (block 407=NO), the method 400 continues to predefined process block 413 and calculates a damping force that is sufficient to diminish or otherwise eliminate the flutter excitation. For instance, the desired damping force may be just sufficient to bring the harmonic oscillation amplitude/frequency to within acceptable range. Determining a sufficient damping force in order to reduce the flutter's harmonic oscillation may include retrieving, via a system controller from a resident or remote memory device, a command signal strength from a lookup table that correlates command signal strength with damping force magnitudes. At process block 415, the system controller transmits one or more command signals to the flutter countermeasure device(s) to generate the damping force in order to mitigate the flutter being experienced by the spoiler. At decision block 417, the method 400 determines if the flutter's harmonic oscillation has been sufficiently diminished. If the flutter excitation on the spoiler has not been brought to within the pre-defined acceptable range (block 417=NO), the method 400 may return to input/output block 403 and cycle back through the operations subsequent thereto. If, however, the flutter excitation on the spoiler has been sufficiently diminished and, thus, brought to within acceptable range (block 417=YES), the method 400 moves to terminal block 411.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating an active aerodynamic system of a motor vehicle, the active aerodynamic system including a system controller and a spoiler mounted on a vehicle body of the motor vehicle, the method comprising:
   detecting, via the system controller based on sensor data received from a sensing device, a flutter excitation experienced by the spoiler during operation of the motor vehicle;
   determining, via the system controller, a harmonic oscillation amplitude of the flutter excitation experienced by the spoiler;
   determining, via the system controller, if the harmonic oscillation amplitude of the flutter excitation is greater than a calibrated threshold amplitude;
   determining, responsive to the harmonic oscillation amplitude exceeding the calibrated threshold amplitude, a damping force sufficient to reduce the harmonic oscillation amplitude to below the calibrated threshold amplitude; and
   transmitting, via the system controller to a flutter countermeasure device operatively attached to the spoiler, a command signal to generate the damping force and thereby mitigate the flutter excitation.

2. The method of claim 1, wherein the flutter countermeasure device includes a fluid cavity, and wherein the sensing device from which the sensor data is received includes a pressure sensor operatively attached to the fluid cavity and operable to detect a pressure differential therein.

3. The method of claim 1, wherein the flutter countermeasure device includes an accelerometer attached to the spoiler, and wherein the sensing device from which the sensor data is received includes the accelerometer operable to detect oscillating displacement of the spoiler.

4. The method of claim 1, wherein the motor vehicle includes a vehicle dynamics sensor attached to the vehicle body, and wherein the sensing device from which the sensor data is received includes the vehicle dynamics sensor operable to detect a dynamic operating condition of the motor vehicle.

5. The method of claim 4, wherein the dynamic operating condition of the motor vehicle includes a component position of a suspension component of the motor vehicle, a vehicle acceleration of the motor vehicle, a vehicle speed of the motor vehicle, and/or an air speed of ambient air flowing across the motor vehicle.

6. The method of claim 1, wherein determining the damping force sufficient to reduce the harmonic oscillation amplitude includes retrieving, via the system controller from a memory device, a command signal strength from a lookup table that correlates multiple signal strengths with corresponding damping force magnitudes.

7. The method of claim 1, wherein the flutter countermeasure device includes a magnetorheological (MR) fluid damper mechanically coupled to the spoiler and selectively actuable to produce a magnetic field that modulates a viscosity of an MR fluid contained in the MR fluid damper to thereby generate the damping force to mitigate the flutter excitation.

8. The method of claim 7, wherein the MR fluid damper includes a cylinder mounted to one of a decklid of the motor vehicle or an airfoil body of the spoiler, a piston reciprocally movable within the cylinder and mounted to the other of the decklid or the airfoil body, and an electromagnet attached to the cylinder and operable to produce the magnetic field, the piston and cylinder cooperatively defining therebetween a sealed fluid chamber containing the MR fluid.

9. The method of claim 1, wherein the flutter countermeasure device includes an unequal area (UEA) linear damper mechanically coupled to the spoiler and including a piston and selectively actuable fluid ports acting on opposing faces of the piston to modulate movement of the spoiler to thereby generate the damping force to mitigate the flutter excitation.

10. The method of claim 9, wherein the UEA linear damper includes a cylinder mounted to one of a decklid of the motor vehicle or an airfoil body of the spoiler, and the piston reciprocally movable within the cylinder and mounted to the other of the decklid or the airfoil body, the piston and cylinder cooperatively defining fluid chambers on opposing sides of the piston, each of the fluid ports regulating exit and/or entry of hydraulic fluid into a respective one of the fluid chambers.

11. The method of claim 1, wherein the flutter countermeasure device includes a ball-screw linear mass damper mechanically coupled to the spoiler and including a ball nut, a threaded screw shaft extending through the ball nut, and a motor operable to rotate the ball nut to translate the threaded screw shaft to thereby generate the damping force to mitigate the flutter excitation.

12. The method of claim 11, wherein the ball-screw linear mass damper includes a pair of ball-screw assemblies each mounted at a respective end of an airfoil body of the spoiler, each of the ball-screw assemblies including a respective ball nut receiving therethrough a respective threaded screw shaft bearing at one end thereof a respective damper mass.

13. The method of claim 1, wherein the flutter countermeasure device includes a variable-volume bladder damper mechanically coupled to the spoiler and including a fluid bladder and a pump operable to selectively fill the bladder with fluid to modulate a working mass of the spoiler to thereby generate the damping force to mitigate the flutter excitation.

14. The method of claim 13, wherein the variable-volume bladder damper includes a pair of the bladders mounted inside respective cavities at opposing ends of an airfoil body of the spoiler, and a fluid reservoir fluidly connected to the bladders.

15. A motor vehicle comprising:
   a vehicle body with a plurality of road wheels mounted to the vehicle body;
   a prime mover attached to the vehicle body and configured to drive one or more of the road wheels to thereby propel the motor vehicle;
   an aerodynamic spoiler mounted to the vehicle body and including a flutter countermeasure device; and
   a system controller configured to regulate operation of the flutter countermeasure device, the system controller being programmed to:
      detect, based on sensor data received from a sensing device, a flutter excitation experienced by the spoiler during operation of the motor vehicle;
      determine a harmonic oscillation amplitude of the flutter excitation experienced by the spoiler;
      determine if the harmonic oscillation amplitude of the flutter excitation is greater than a calibrated threshold amplitude;
      responsive to the harmonic oscillation amplitude exceeding the calibrated threshold amplitude, determine a damping force sufficient to reduce the harmonic oscillation amplitude to below the calibrated threshold amplitude; and
      transmit a command signal to the flutter countermeasure device to generate the damping force and thereby mitigate the flutter excitation.

16. The motor vehicle of claim 15, wherein the flutter countermeasure device includes a fluid cavity and a pressure sensor operatively attached to the fluid cavity, and wherein the sensing device from which the sensor data is received includes the pressure sensor operable to detect a pressure differential in the fluid cavity.

17. The motor vehicle of claim 15, wherein the flutter countermeasure device includes a magnetorheological (MR) fluid damper mechanically coupled to the spoiler and selectively actuable to produce a magnetic field that modulates a viscosity of an MR fluid contained in the MR fluid damper to thereby generate the damping force to mitigate the flutter excitation.

18. The motor vehicle of claim 15, wherein the flutter countermeasure device includes an unequal area (UEA) linear damper mechanically coupled to the spoiler and including a piston and selectively actuable fluid ports acting on opposing faces of the piston to modulate movement of the spoiler to thereby generate the damping force to mitigate the flutter excitation.

19. The motor vehicle of claim 15, wherein the flutter countermeasure device includes a ball-screw linear mass damper mechanically coupled to the spoiler and including a ball nut, a threaded screw shaft extending through the ball nut, a damper mass mounted at one end of the threaded screw shaft, and a motor operable to rotate the ball nut to translate the threaded screw shaft to thereby generate the damping force to mitigate the flutter excitation.

20. The motor vehicle of claim 15, wherein the flutter countermeasure device includes a variable-volume bladder damper mechanically coupled to the spoiler and including a fluid bladder and a pump operable to selectively fill the bladder with fluid to modulate a working mass of the spoiler to thereby generate the damping force to mitigate the flutter excitation.

* * * * *